P. P. COOKINGHAM.
NOISELESS CAR WHEEL.
APPLICATION FILED MAR. 15, 1910.

970,185. Patented Sept. 13, 1910.

Witnesses
C. C. Holly
L. Belle Rice

Inventor
Peter Park Cookingham
by James R. Townsend
his atty

UNITED STATES PATENT OFFICE.

PETER PARK COOKINGHAM, OF LONGBEACH, CALIFORNIA, ASSIGNOR OF ONE-THIRD TO WILLIAM R. BRUNER, OF LONGBEACH, CALIFORNIA.

NOISELESS CAR-WHEEL.

970,185.  Specification of Letters Patent.  Patented Sept. 13, 1910.

Application filed March 15, 1910. Serial No. 549,544.

*To all whom it may concern:*

Be it known that I, PETER PARK COOKINGHAM, a citizen of the United States, residing at Longbeach, in the county of Los Angeles and State of California, have invented a new and useful Noiseless Car-Wheel, of which the following is a specification.

The object of this invention is to provide a wheel for railway cars which will be noiseless, strong, simple and cheap.

In this invention the wheel comprises one or more metal portions and sound deadening material in one or more cavities as will be made plain in the subjoined detailed description, and in this respect the invention is applicable to all car wheels having cavities in which the sound deadening material will be retained after becoming set.

The invention may be carried out in various ways.

The accompanying drawings illustrate the invention in the best form in which I at present contemplate embodying it.

Figure 1:
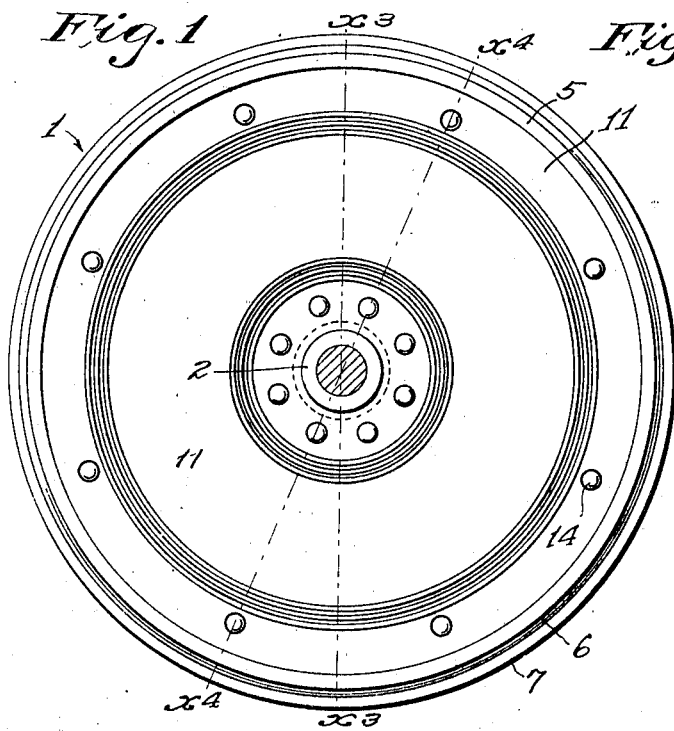
Figures 3, 4:
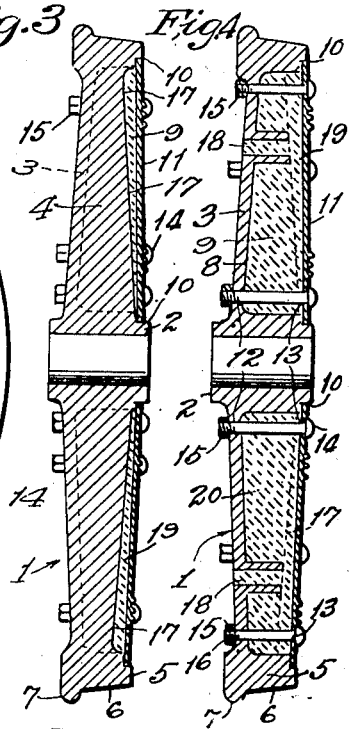
Figure 2:
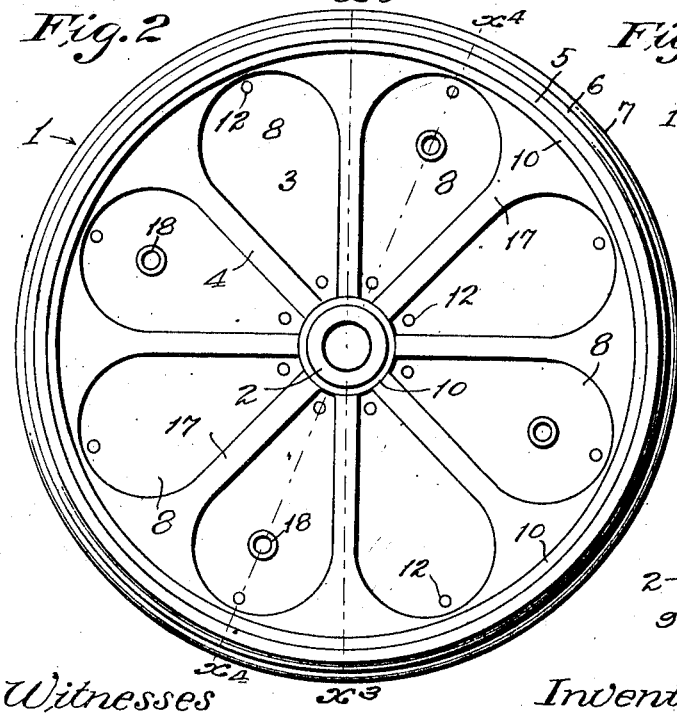
Figure 5:
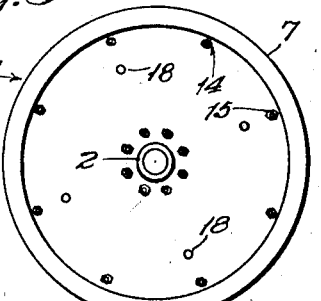
Figure 6:
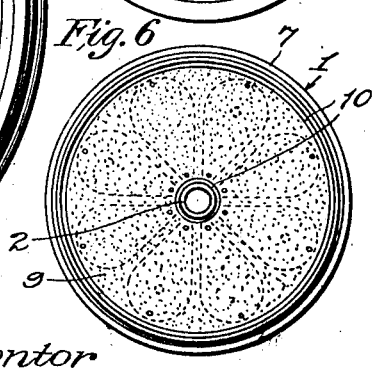

Figure 1 is a view of a wheel embodying this invention as seen from the outer end of a car axle which is shown in place and in section. Fig. 2 is a view of the frame of the wheel detached. Fig. 3 is a section of the wheel on line indicated by $X^3$, Figs. 1 and 2. Fig. 4 is a section on line indicated by $X^4$, Figs. 1 and 2. Fig. 5 is a reduced view of the wheel from the side opposite that shown in Figs. 1 and 2. Fig. 6 is a reduced view of the frame and the filling therein, the side plate being omitted.

The frame 1 is made of any suitable metal, as iron or steel, cast in the usual method employed in casting metal and is provided with a hub 2, back plate 3, spokes 4, rim 5, tread 6, flange 7 and cavities 8, formed between the rim, spokes and hub and adapted to receive a filling 9 of plaster of paris or other cement-like material which may be poured into the cavities and will harden therein.

The face of the frame is provided with an annular seat 10 between the rim and the hub to receive a face-plate 11, which is preferably made of a sheet of steel, iron or other suitable material; and said face-plate and frame are provided with bolt holes 12 and 13 for the face-plate bolts 14 which extend in the frame and through the face-plate to hold the face-plate securely in the seat 10; said bolts may be riveted or may be secured by nuts 15 and for greater security may be riveted in the nuts at their ends 16. The spokes 4 are recessed by depressions 17 deepening toward the rim, and tubular ports 18 are provided extending through the plate 3 and cavities 8 to the plane of the inner face of the spokes and terminating in the cavity so that when the face-plate 11 is fastened in its seat, the frame may be laid flat with its back plate 3 uppermost. Then plaster of paris, Portland cement or like material that will harden after being poured, and which is practically non-resonant when solid, will be poured through the ports 18, thus to fill the spaces between the face plate 11 and the back plate 3. The filling thus poured into the spaces will form an annular plate 19 extending unbroken entirely around inside the rim, and provided with bosses 20 projecting into and entirely filling the inter-spoke spaces 8.

The metal spokes 4 are preferably symmetrically tapered or reduced in transverse section from the hub toward the rim and the form thus given to the spoke produces the depression 17 for the reception inside the plate 19 of the material which constitutes the filling.

The finished wheel thus comprises conjoined castings of metal and non-resonant material and such material is protected by a facing so that the propagation of sound vibrations that might otherwise occur in the metal casting or frame will be nullified or minimized.

By providing bolt holes 12 between the spokes as shown, vents are provided through which air may escape from the inter-spoke spaces of the annular cavity during the process of pouring the plaster of paris or other cement like material or sound deadening filling.

I claim:—

1. A car wheel comprising a hub and rim, a plate connecting the hub and rim, a cavity being provided between the hub and rim, an annular seat formed in the hub and rim, a face plate in said seat, bolts fastening the face plate to the plate that connects the hub and rim, and a non-resonant filling in the cavity between the plates.

2. A car wheel comprising a frame having a rim, a hub, a plate, and spokes on one side of said plate connecting the hub and rim and forming an annular cavity extending around inside the rim and between the spokes, said spokes being reduced outwardly; a filling of non-resonant material in said cavity, a face plate to close the cavity and means to fasten the face plate to the frame.

3. A car wheel comprising a casting consisting of a plate with bosses thereon, a frame comprising a hub, a rim, a plate and spokes; said bosses fitting between said spokes; a plate to cover the casting, and bolts to secure said plate and the frame together.

4. A car wheel comprising a frame having a hub, a rim, and a plate connecting the hub and rim; a cavity being provided on one side of said plate between the hub and rim, and ports extending through the plate; and a face plate secured to the frame for the purpose of inclosing the cavity into which sound-deadening material may be poured through the ports.

5. In a wheel a frame having a hub, a rim, and a plate and spokes connecting said hub and rim and forming a cavity on one side of the plate with inter-spoke spaces, said plate being provided with tubular ports; and a plate closing the cavity and secured to the frame, so that liquid plaster of paris or other cement-like material may be poured into the cavity to close the same.

6. The combination with a metal frame comprising a hub, a rim, a plate connecting the hub and rim, and spokes on one side of said plate, there being inter-spoke spaces between the hub and the rim; a face plate between the hub and rim to inclose the cavity, the inter-spoke spaces being inter-communicating; bolts fastening the face plate to the plate of the frame and a non-resonant filling in the cavity between the plates.

In testimony whereof, I have hereunto set my hand at Los Angeles, California, this 7th day of March, 1910.

PETER PARK COOKINGHAM.

In presence of—
JAMES R. TOWNSEND,
L. BELLE RICE.